(12) United States Patent
Clifford et al.

(10) Patent No.: US 11,067,054 B2
(45) Date of Patent: Jul. 20, 2021

(54) VORTEX GENERATOR

(71) Applicant: NATIONAL UNIVERSITY OF IRELAND, GALWAY, Galway (IE)

(72) Inventors: Eoghan Clifford, Galway (IE); Sean Mulligan, Galway (IE)

(73) Assignee: National University of Ireland, Galway, Galway (IE)

( * ) Notice: Subject to any disclaimer, the term of this patent is extended or adjusted under 35 U.S.C. 154(b) by 0 days.

(21) Appl. No.: 16/626,205

(22) PCT Filed: Jun. 21, 2018

(86) PCT No.: PCT/EP2018/066661
§ 371 (c)(1),
(2) Date: Dec. 23, 2019

(87) PCT Pub. No.: WO2018/234502
PCT Pub. Date: Dec. 27, 2018

(65) Prior Publication Data
US 2020/0124019 A1    Apr. 23, 2020

(30) Foreign Application Priority Data
Jun. 21, 2017   (EP) .................................... 17177258

(51) Int. Cl.
*F03B 3/18* (2006.01)
*B01F 3/04* (2006.01)

(52) U.S. Cl.
CPC .......... *F03B 3/186* (2013.01); *B01F 3/04539* (2013.01); *B01F 2003/04631* (2013.01); *B01F 2003/04865* (2013.01); *F05B 2220/602* (2013.01); *F05B 2240/122* (2013.01); *F05B 2240/132* (2013.01)

(58) Field of Classification Search
CPC .................. F03B 3/186; B01F 3/04539; B01F 2003/04631; B01F 2003/04865; F05B 2220/602; F05B 2240/122; F05B 2240/132; F05B 2250/315
See application file for complete search history.

(56) References Cited

U.S. PATENT DOCUMENTS

| 2011/0291417 A1 | 12/2011 | Han |
| 2015/0233340 A1* | 8/2015 | Levi ........................ F03B 13/06 405/76 |

FOREIGN PATENT DOCUMENTS

| AT | 413 579 B | 4/2006 |
| JP | 2010174678 A | * 8/2010 |
| JP | 2010174678 A | 8/2010 |
| WO | 2004/061295 A2 | 7/2004 |
| WO | 2017/097943 A1 | 6/2017 |

OTHER PUBLICATIONS

Reynolds, Patrick, "Hydropower—naturally?" International Water Power & Dam Construction, Jun. 1995, vol. 47, No. 6, p. 48.
Aug. 29, 2018 International Search Report issued in International Patent Application No. PCT/EP2018/066661.

* cited by examiner

*Primary Examiner* — Tulsidas C Patel
*Assistant Examiner* — Joseph Ortega
(74) *Attorney, Agent, or Firm* — Oliff PLC

(57) ABSTRACT

A vortex generator apparatus including a fluid intake duct, a fluid tank including: a first fluid inlet port, a second fluid inlet port, and a fluid outlet port. A turbine is provided outside of the fluid tank in fluid communication with the fluid outlet port.

17 Claims, 10 Drawing Sheets

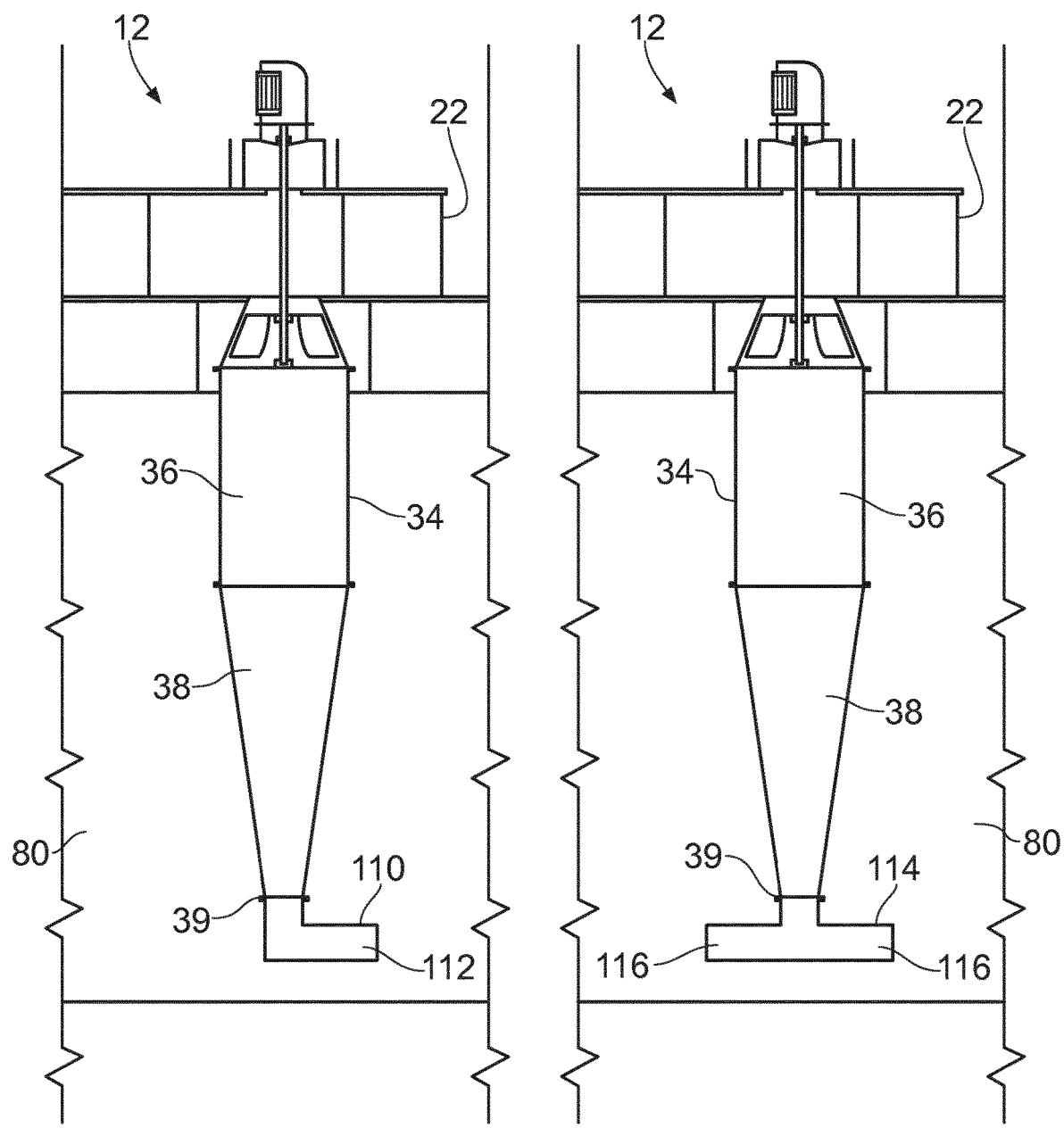

VORTEX GENERATOR

The present disclosure relates to a vortex generator.

In particular the disclosure is concerned with a vortex generator for a fluid working apparatus, a fluid working apparatus comprising a vortex generator, and a fluid working system comprising a vortex generator.

BACKGROUND

Effective mixing of different fluids is a requirement in different industries, for different reasons.

For example, mixing of air and water (a process referred to as "aeration") in a wastewater treatment aids effectiveness of the treatment process. Also mixing of fuel and air for enhanced combustion and effective mixing of materials in industrial process and chemical engineering are also of clear importance.

In addition, where applicable, energy recovery from mixing processes helps to offset the cost of running the mixing apparatus. For example, there has been a notable increase in popularity of recovering energy from the natural fall of sewage water in urban sewer systems and outfalls of wastewater treatment plants. For example, JP 2010174678 A relates to a hydraulic energy recovery device. Also there is great interest in the development of micro-hydropower generation at low-head sites due to their natural abundance.

However, one of the primary barriers to exploitation of these low-head hydropower sites is that conventional hydropower technologies cannot efficiently harness power from these fluid sources.

Hence an apparatus which may process fluid to achieve enhanced mixing, or be worked on by fluid to recover energy from a system with a high efficiency, or both, is highly desirable.

SUMMARY

According to the present disclosure there is provided an apparatus as set forth in the appended claims. Other features of the invention will be apparent from the dependent claims, and the description which follows.

Accordingly there may be provided a vortex generator apparatus comprising: a fluid intake duct, and a fluid tank comprising: a first fluid inlet port, a second fluid inlet port, and a fluid outlet port. A turbine may be provided outside of the fluid tank in fluid communication with the fluid outlet port.

The fluid tank may define a substantially cylindrical swirl chamber, centred on a fluid rotational axis; the second fluid inlet port, fluid outlet port and turbine also being centred on the fluid rotational axis.

The second fluid inlet port and the fluid outlet port may be centred on the fluid rotational axis at opposite sides of the fluid tank. The fluid outlet port may be spaced between the second fluid inlet port and the turbine.

A fluid outlet duct may be in fluid communication with the fluid outlet port.

The turbine may be located within the fluid outlet duct.

The fluid outlet duct may have a divergent wall section around the turbine.

The fluid outlet duct may further comprise, in series with the divergent wall section: a parallel wall section; and a convergent wall section terminating at a duct exit.

The fluid intake duct may be: in fluid communication with the first fluid intake port; provided substantially on a tangent to a side wall of the fluid tank; and aligned to deliver fluid to an internal surface of the fluid side wall to thereby induce swirl about the fluid rotational axis.

A shaft may extend from the turbine.

The shaft may extend from the turbine, through the fluid outlet port, through the fluid tank, and through the second fluid inlet port.

The fluid outlet port may comprise an extended mouth which extends towards an inlet of the turbine.

The extended mouth may comprise an outlet having a diameter which is smaller than the diameter of the turbine inlet.

A vent hole may be provided in the wall of the duct. The vent hole may be downstream of the extended mouth outlet and may be upstream of the turbine inlet.

There may also be provided a fluid working apparatus comprising a vortex generator as according to the present invention.

The fluid working apparatus may further comprise: a fluid delivery apparatus in flow communication with the fluid intake duct; the fluid delivery apparatus comprising a fluid pump.

There may also be provided a fluid working system comprising a fluid working apparatus according to the present disclosure. The system may further comprise: a first fluid reservoir; the fluid pump being in fluid communication with the first fluid reservoir to thereby extract fluid from the fluid reservoir; a second fluid source; and the second fluid inlet port being in fluid communication with the second fluid source.

The swirl chamber outlet duct exit may be submerged beneath the surface of the first fluid in the first fluid reservoir to thereby deliver a mix of the first fluid and second fluid to the first fluid reservoir.

The fluid working system may further comprise a support structure which maintains the swirl chamber above the level of the surface of the fluid in the first fluid reservoir.

Hence there is provided an apparatus configured for the mixing of fluid and/or also which may provide a core of an energy recovery system.

BRIEF DESCRIPTION OF THE DRAWINGS

Examples of the present disclosure will now be described with reference to the accompanying drawings, in which:

FIG. 9 shows an alternative example of a part of a fluid working system including the vortex generator of the present disclosure;

FIG. 10 shows a further alternative example of a part of a fluid working system including the vortex generator of the present disclosure;

DETAILED DESCRIPTION

Figure 6:
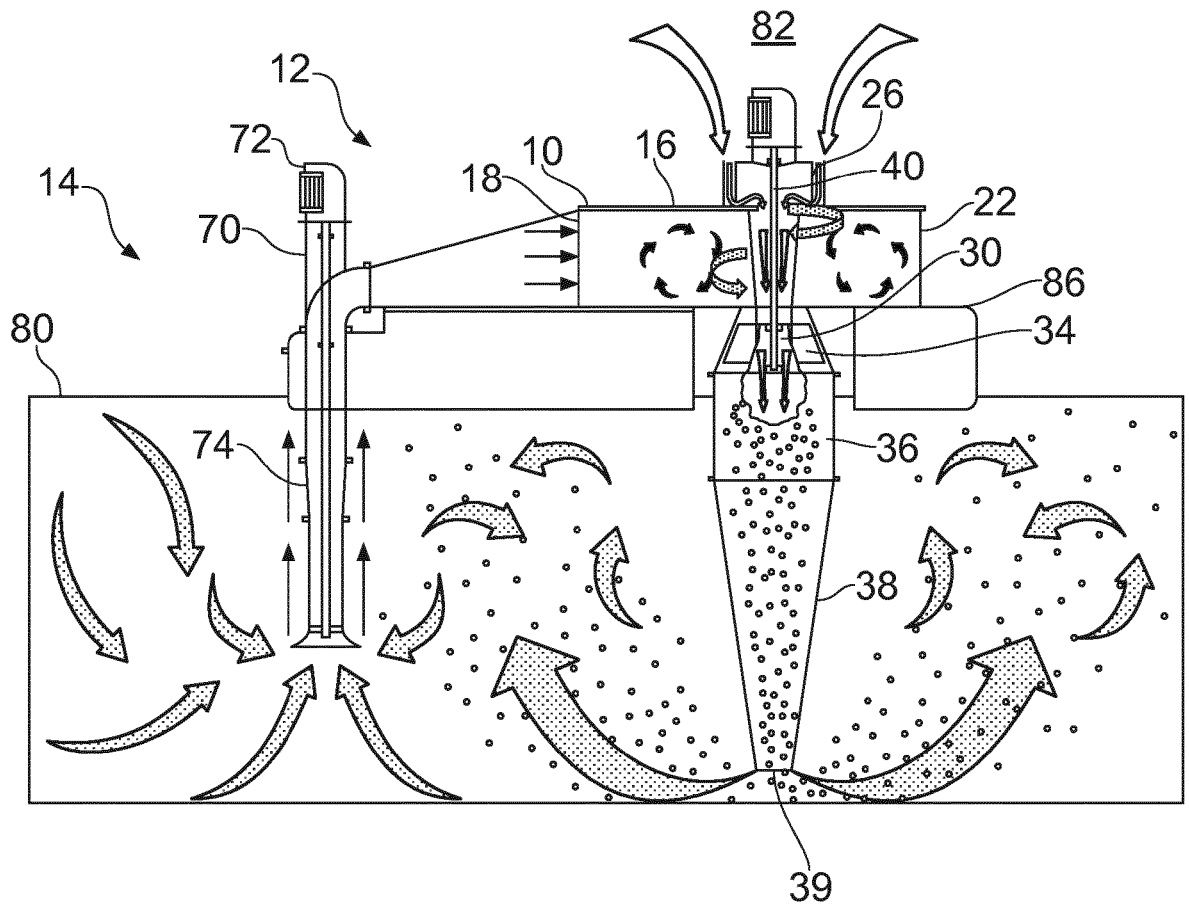
FIG. 6 shows an example of a fluid working system including the vortex generator of the present disclosure.

FIGS. 1 to 5 show different sectional views of a vortex generator 10 according to the present disclosure. FIG. 6 shows the vortex generator 10 as part of a fluid working apparatus 12, which in turn part of a fluid working system 14, according to the present disclosure. In the context of the present disclosure, a "fluid working apparatus" and "fluid working system" are assemblies and/or arrangements in which work is done on a fluid by a part of the apparatus or system, and/or in which fluid works on a part of the apparatus or system. Put another way, a "fluid working apparatus" and "fluid working system" are assemblies and/or arrangements in which energy (for example potential energy or kinetic energy) may be extracted from a fluid, and/or in which fluid is processed by the apparatus or system.

The vortex generator apparatus 10 comprises a fluid intake duct 16 which comprises an intake/inlet 18. The fluid intake duct 16 is coupled to, or is integral with, a swirl housing 20. The fluid intake duct 16 may comprise a control valve operable to regulate the flow of fluid through the fluid intake duct 16. The swirl housing 20 comprises a fluid tank 22, a first fluid inlet port 24 which defines where the fluid intake duct 16 ends and the fluid tank 22 begins. That is to say, the fluid tank 22 provides the essential geometry of the swirl housing 20, which may be provided as a substantially cylindrical swirl chamber. Put another way, the fluid tank 22 is a housing which is configured to induce swirl in fluid passing through the fluid tank.

The fluid tank 22 may comprise walls which define an enclosed volume. In some examples the fluid tank 22 may be sealed so that it may be pressurised. In other examples the tank may have an opening to atmosphere, such that fluid in the tank may have a free-surface.

The swirl housing 20 further comprises a second fluid inlet port 26 and a fluid outlet port 28. The fluid inlet port 26 may comprise a control valve operable to regulate the flow of fluid through the inlet port 26.

The vortex generator 10 further comprises a turbine 30, where the turbine 30 is provided outside of the fluid tank 22. Vanes 29 may be provided in the fluid outlet port 28. The vanes 29 may be configured to direct fluid onto the turbine 30, and to induce swirl in the chamber 22. The vanes 29 may be static vanes (i.e. immovable, fixed) or variable (i.e. their angle relative to the walls of the outlet 28 and/or the turbine is adjustable). The turbine 30 may comprise one or more turbine blades 31. The turbine 30 is provided in fluid communication with the fluid outlet port 28. The turbine 30 may be provided immediately downstream of the fluid outlet port 28.

The fluid tank 22 (and hence the swirl chamber 20) defines a fluid rotational axis 32. That is to say, the fluid tank 22 defines a substantially cylindrical swirl chamber 20 centred on a fluid rotational axis 32. The second fluid inlet port 26, the fluid outlet port 28 and the turbine 30 are centred on the fluid rotational axis 32. That is to say, the second fluid inlet port 26, the fluid outlet port 28 and the turbine 30 are concentric and coaxial with the fluid rotational axis 32.

The fluid intake duct 16 is in fluid communication with the first fluid inlet port 24, where the fluid intake duct 16 is provided substantially on a tangent to a sidewall of the fluid tank 22, the fluid intake duct 16 being aligned to deliver fluid to an internal surface 33 of the fluid tank 22 sidewall to thereby induce swirl and circulation about the fluid rotational axis 32.

Hence the shape of the internal surface 33 and inlet duct 16 of the fluid tank 22 defines the path of fluid passing through the tank 22, the surface being configured to promote the generation of a vortex about the fluid rotational axis 32.

The second fluid inlet port 26 and the fluid outlet port 28 are centred on the fluid rotational axis 32 at opposite ends of the fluid tank 22, the fluid outlet port 28 being spaced between the second fluid inlet port 26 and the turbine 30.

A fluid outlet duct 34 is provided in fluid communication with the fluid outlet port 28. The turbine 30 is located within the fluid outlet duct 34. The outlet duct 34 may extend beyond the end of the turbine 30, so that the turbine 30 is enclosed completely within the outlet duct 34. That is to say, the outlet duct 34 may bound the turbine 30. The duct 34 has an outlet 39.

A shroud may be provided around the turbine blades 31. That is to say, a casing may be provided around the rotatable blade or blades 31 of the turbine, with a small clearance provided between the shrouded blades and the casing/duct 34. In such an example the shroud sits in the duct 34, and may thus locate the turbine 30 in the duct.

The outlet duct 34 extends away from the fluid outlet port 28, with a divergent wall section such that the duct outlet 39 is larger than that fluid outlet port 28. The turbine 30 is located within the divergent wall section of the outlet duct 34. That is to say, the outlet duct 34 may be frusto-conical. Put another way, the fluid outlet duct 34 has a divergent wall section around the turbine 30.

The outlet duct 34 may also extend to comprise a parallel wall section 36 which extends away from the divergent/frusto-conical section 34. The outlet duct 34 may further comprise a convergent wall section 38 which extends "downstream" from the parallel wall section 36, getting narrower towards the duct exit 39. Hence the divergent section 34, parallel wall section 36 and convergent wall section 38 may be provided in series, as shown in FIG. 6.

In use, the duct exit 39 may be located beneath the surface of a fluid reservoir, for example a reservoir of the first fluid. Such an arrangement enables mixing and, as appropriate, aeration.

In other examples, for example power generation, the duct exit may exhaust into a free space, spaced apart from a source of the first fluid, for example above a reservoir of first fluid.

In other examples the duct exit 39 may deliver the mixed fluid to a tank or chamber or reactor for further processing.

The internal surface 33 of the outlet duct 34, and duct sections 36, 38, may further comprise helical vanes to direct mixed first and second flows along the duct sections.

A shaft 40 extends from the turbine 30. The shaft 40 supports and carries the impeller 30.

The shaft 40 extends from the turbine 30 through the fluid outlet port 28, through the fluid tank 22 and through the second fluid inlet port 26. A generator 44 may be coupled to the end of the shaft 40. In other examples, the shaft 40 may be coupled to a gearing system for transmission to a generator 44 in a different location. Alternatively the power offtake shaft 40 may be coupled to a pump or other energy recovery means which can utilise the rotational output of the shaft 40 in operation. Hence the shaft 40 may, in some examples, be "power off take" shaft.

The generator 44 may be operable to work in reverse to convert electrical energy to mechanical energy and impart rotation from the turbine impellors 31 to the fluid for mixing.

Alternatively the shaft 40 may be coupled only to the turbine 30, and mounted on a bearing to allow the turbine 40 to spin freely. In another example, a brake or clutch may be provided to provide a braking load on the shaft or turbine, limiting the freedom of the turbine to rotate, and thereby artificially reducing the maximum rotational spin of the turbine 30. Alternatively the turbine may be rotatably mounted by any suitable means.

The second fluid inlet port 26 may comprise a housing 46 provided on top of the fluid tank 22, with the generator 44, or other energy recovery means, being mounted to the top of the housing 46.

Since the vortex generator has a number of applications, its mode of operation may vary.

The vortex generator may be employed in flow communication with a first fluid source and a second fluid source. The first fluid source may be a source of liquid, where the source is a free flowing (for example from a river, or down a duct from an elevated reservoir) or pumped under pressure source (for example from a pressurised or pumped source). The first fluid may also be a gas, delivered from a pressurised or pumped source. The second fluid source may be the local atmosphere/environment, drawing in gaseous air under the action of the first fluid, or a liquid held in a reservoir drawn into the fluid tank by the action of the first fluid, or gas or liquid from a pressurised or pumped source delivered into the fluid/swirl tank independent of the flow characteristics of the first fluid. The first fluid may be denser than the second fluid.

Figure 1:
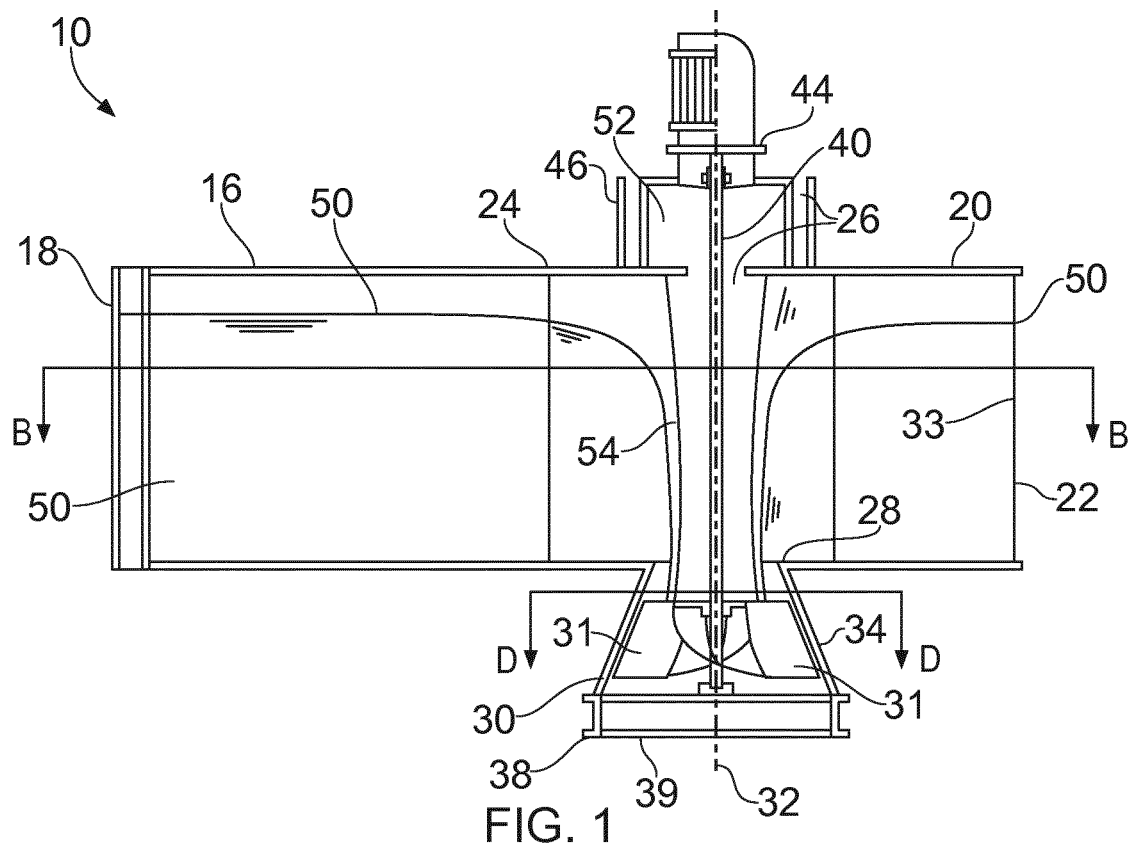
FIG. 1 shows a sectional view of a vortex generator according to the present disclosure.
Figure 2:
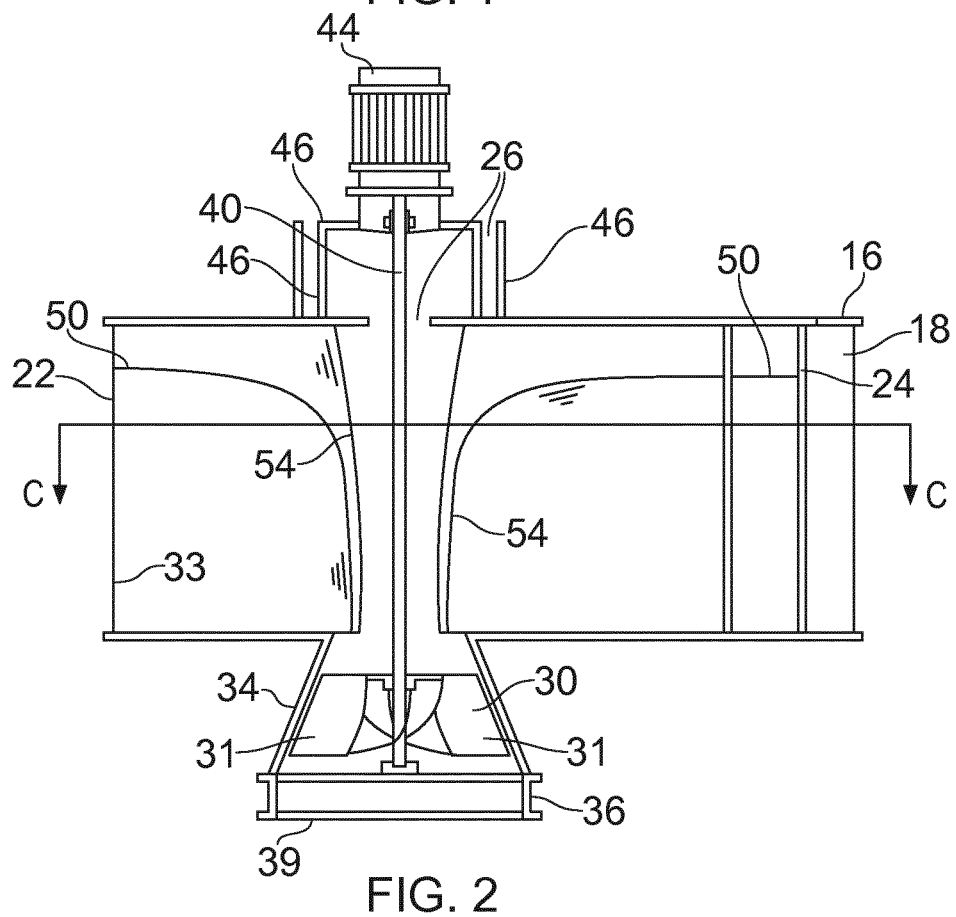
FIG. 2 shows a sectional view along line B-B shown in FIG. 1.

Hence, in operation in a first example, a first fluid 50, provided as a free flowing or pumped liquid, is delivered to the fluid intake duct 16, and travels through the fluid intake duct 16 into the fluid tank 22 where it passes to the fluid outlet port 28. When the first fluid 50 reaches a sufficiently high level (for example as illustrated in FIGS. 1, 2) the fluid will swirl around the rotational axis 32 in the fluid tank 22. Hence a swirl is induced by the momentum of the first fluid 50 as the first fluid 50 passes through the fluid intake duct 16 into the fluid tank 22 and around the internal surface 33 of the fluid tank 22. At the same time a second fluid 52 (for example a gas, and in particular air) is drawn into the second fluid inlet port 26 from a second fluid source (e.g. the surrounding environment). The second fluid 52 is drawn in by the act of the first fluid 50 passing through the fluid outlet duct 28. When the first fluid 50 level reaches a predetermined height in the intake duct 16 and fluid tank 22, the swirl in the fluid tank 22 and interaction with the second fluid 52 generates a vortex (indicated generally as "54" in FIG. 1 and FIG. 2). The vortex 54 is manifested as a high velocity rotating/swirling jet of the first fluid 52 around a core, void, or column of second fluid 52 which extends from the second fluid inlet port 26 to the fluid outlet port 28.

If the rate of flow of the first fluid into the tank 22 is too high, therefore filling the fluid tank 22 faster than it can empty through the outlet port 28, then the first fluid level rises to cut off the second fluid inlet port 26. At this point the vortex 54 will collapse, choking the flow into the fluid tank 22 until sufficient fluid has drained through the outlet port 28 for the vortex to re-establish. In this way, the maximum flow rate through the vortex generator 10 is self-limiting.

In a second example the first fluid may be a liquid from a pressurised or pumped source (for example a fuel supply) and the second fluid is a gas from a pressurised or pumped source (for example air). A valve or other flow regulation device may be provided to control the supply of first fluid. Likewise a valve or other flow regulation device may be provided to control the supply of second fluid. In such, the mode of operation is similar to the first example other than the air flow can be more carefully regulated to maintain an air fuel ratio and to help to maintain the core/void of the vortex.

In both examples, when the vortex 54 is formed and rotating about the fluid rotational axis 32, the first fluid 50 and second fluid 52 exit the fluid outlet 28. The swirl of the first fluid 50 departing from the vortex 54 imparts rotational motion to the turbine 30 as the flow passes the turbine blades 31. The first fluid 50 is mixed with the second fluid 52 by the blades 31.

In the case of a liquid and a gas, this results in bubbles of gas being formed in the first fluid (liquid). The blades 31 and gas may act to atomise the liquid, generating a spray. The first fluid, already in a fully turbulent state, hits the turbine blades 31 and entrains the second fluid (gas) central core/void, and impellor impact and flow shearing results in the first and second fluid becoming mixed as they leave the duct 34.

In examples where the duct 34 may be configured to ensure that overall fluid velocity in the duct 34 is greater than or equal to the terminal rising velocity of the largest gas bubble to ensure the bubbles are transported out of the duct exit 39, rather than floating back toward the turbine 30.

In the case of first fluid and second fluid both being liquids, the flow of separate liquids may be interrupted by the turbine which will promote mixing of the two liquids.

The mix of fluids 50, 52 then passes through the duct 34, 36 to exit the outlet duct 34.

In examples in which the shaft 40 is present, and since the turbine 30 is fixed to the shaft 40, rotation of the turbine 30 results in rotation of the shaft 40. Hence in examples where present the rotating shaft 40 is operable to turn the energy recovery means (e.g. generator 44) due to the vortex 54 generated in the fluid tank 22.

Hence the impeller blades 31 provide rotation of the shaft 40 to enable power generation or operation of another device (e.g. a pump for a different system), but also provide mixing of the first fluid 50 and second fluid 52.

Thus the fluid intake duct 16, fluid tank 22 and turbine 30 may form the basis of a fluid mixing device which mixes the fluids 50, 52.

Also the fluid intake duct 16, fluid tank 22 and turbine 30 may also form the basis of an energy recovery or power generation apparatus if an energy recovery device (e.g. generator) 44 is provided upon a shaft coupled to the rotatable turbine 30.

The location of the turbine 30 relative to where the vortex 54 is formed provides a key advantage of the apparatus of the present disclosure. Flow inside the fluid tank 22 is in a subcritical state. As it passes through the fluid outlet 28 it transitions to a supercritical state. Disturbances downstream of the fluid outlet 28, for example induced by the turbine 30, cannot travel from the super critical region back to the (upstream) sub critical region. Thus disturbances to the flow at the turbine 30 cannot effect the vortex 54, thus maximising energy transfer from the vortex 54 flow to the turbine 30.

Additionally the divergent duct 34 promotes the conversion of the subcritical vortex flow of the first fluid leaving the swirl chamber 20 into a supercritical turbulent annular jet flow for optimally turning the turbine 30, which is beneficial for energy generation/recovery, energy dissipation and/or fluid mixing.

One example of how the vortex generator 10 of the present disclosure may be used is shown in FIG. 6. FIG. 6 shows the fluid working apparatus 12 comprising the vortex generator 10 as previously described. It is termed a fluid working apparatus because the main function of this device is to work the fluids being passed through the vortex generator, with an additional benefit of generating electricity or otherwise recovering energy from the system. The fluid working apparatus 12 comprises a fluid delivery apparatus 70 in flow communication with the fluid intake duct 16. The fluid delivery apparatus 70 in this example comprises a fluid pump 72. In operation the fluid pump 72 will draw fluid from a fluid source, through a duct 74 and deliver it to the fluid intake duct 16. After this the operation of the vortex generator 10 is as described above.

FIG. 6 shows the fluid working apparatus 12 in the context of a fluid working system 14. The fluid working system 14 comprises a first fluid reservoir 80, for example a source of saline water or waste water, the fluid pump 72 being in fluid communication with the first fluid reservoir 80 via the intake duct 74 to thereby extract fluid from the fluid reservoir 80. The fluid working system 14 further comprises a second fluid source 82, which in this example is the surrounding atmosphere, and the second fluid inlet port 26 being provided in fluid communication with the second fluid source.

The swirl chamber outlet duct exit 39 is submerged beneath the surface of the first fluid 80 in the first fluid reservoir 80 to thereby deliver the mix of first fluid 82 and second fluid 80 to the first fluid reservoir 80. Hence as can be seen the mix of fluid 80 and air 82 formed into a vortex 54 and then worked by the turbine 30 provides an aerated fluid which exits the duct 34. Put another way, the act of collapsing the vortex of fluid 80 and fluid 82 on the turbine 30 creates bubbles which are pumped by the action of the turbine 30 through the duct 34 and into the fluid reservoir 80, promoting desired processes in the fluid reservoir 80.

The fluid working system 14 may further comprise a support structure 86, for example a pontoon, which maintains the swirl chamber/tank 22 above the level of the surface of the fluid in the first fluid reservoir 80.

Figure 7:
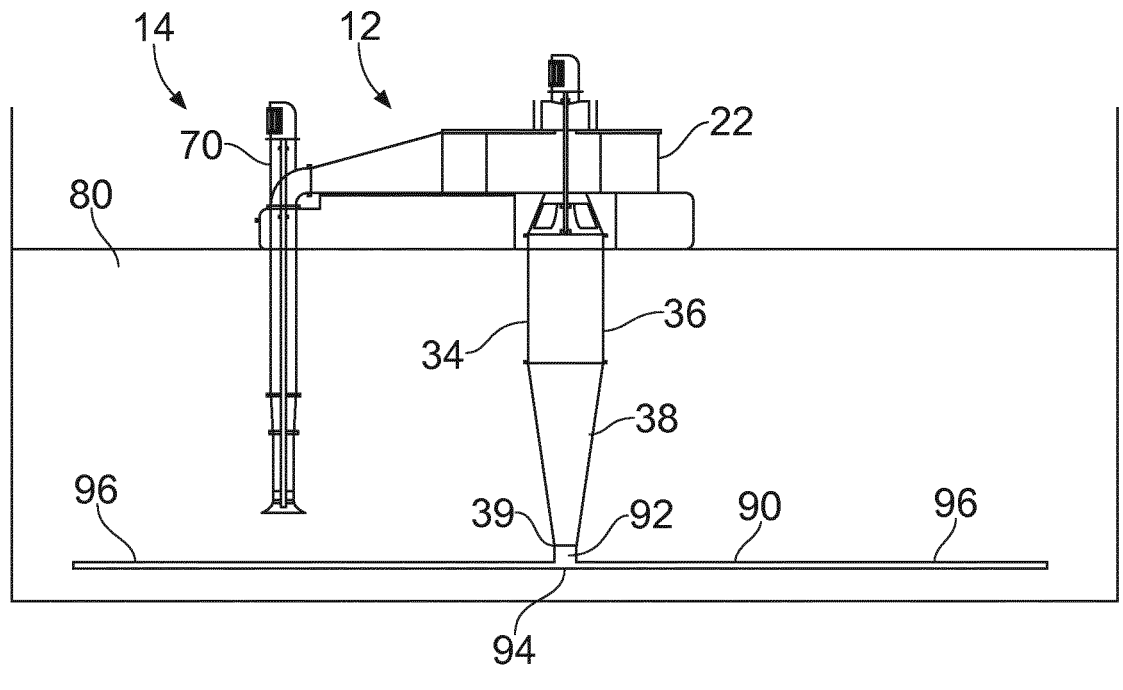
FIG. 7 shows a further example of a fluid working system including a vortex generator of the present disclosure.
Figure 8:
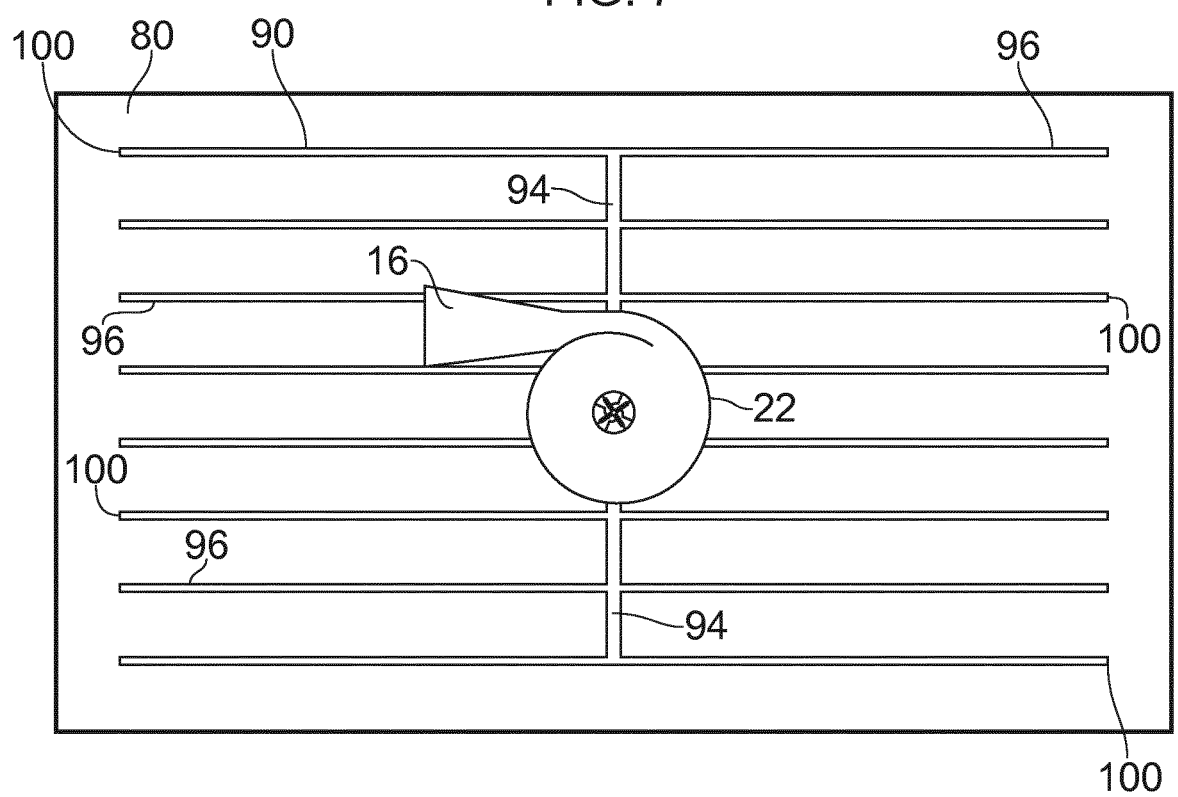
FIG. 8 shows a plan view of the system shown in FIG. 7.

FIGS. 7, 8 show an example of the fluid working system 14 comprising the fluid apparatus 12 provided with a distribution manifold 90 located at the exit of the bubble column. FIGS. 7, 8 show a side and plan view respectively of the modified system 14. Features of the system 14 (e.g. the fluid delivery apparatus 70) are omitted from FIG. 8 for clarity.

The distribution manifold 90 is in fluid communication with the outlet duct exit 39 at a flow coupling 92. In this example the distribution manifold 90 comprises a spine 94 which leads away from the coupling 92. Arms 96 extend away from the spine 94. The spine 94 and arms 96 are hollow and provide a flow passage for fluid and bubbles passed along the duct 34. Apertures 98 (not shown) may be provided along the spine 94 and arms 96 to distribute the fluid and bubbles within the first fluid reservoir 80. Fluid outlets 100 may also be provided at the ends of the arms 96.

FIGS. 9, 10 show further examples of the fluid apparatus 12. In these examples a flow control tube is provided in fluid communication with the outlet duct exit 39. FIG. 9 shows an "L" shaped flow control tube 110 with a single outlet 112. FIG. 10 shows an "T" shaped flow control tube 114 with a pair of outlets 116. In alternative examples a flow control tube may be provided with three or more outlets. The outlets may be arranged to direct the flow away from the outlet duct exit 39 in the same and/or different directions.

The manifold 90 and flow control tubes 110, 114 provide flexibility in maximising distribution of mixed fluids and/or controlling the general flow direction and distribution of mixed fluids in the receiving fluid.

In an example where the fluids being mixed are a liquid and gas (e.g. water and air), the manifold 90 and flow control tubes 110, 114 provide flexibility in maximising gas (e.g. oxygen) transfer efficiency and/or controlling the general flow direction and distribution of mixed fluids in the receiving fluid.

Figure 3:
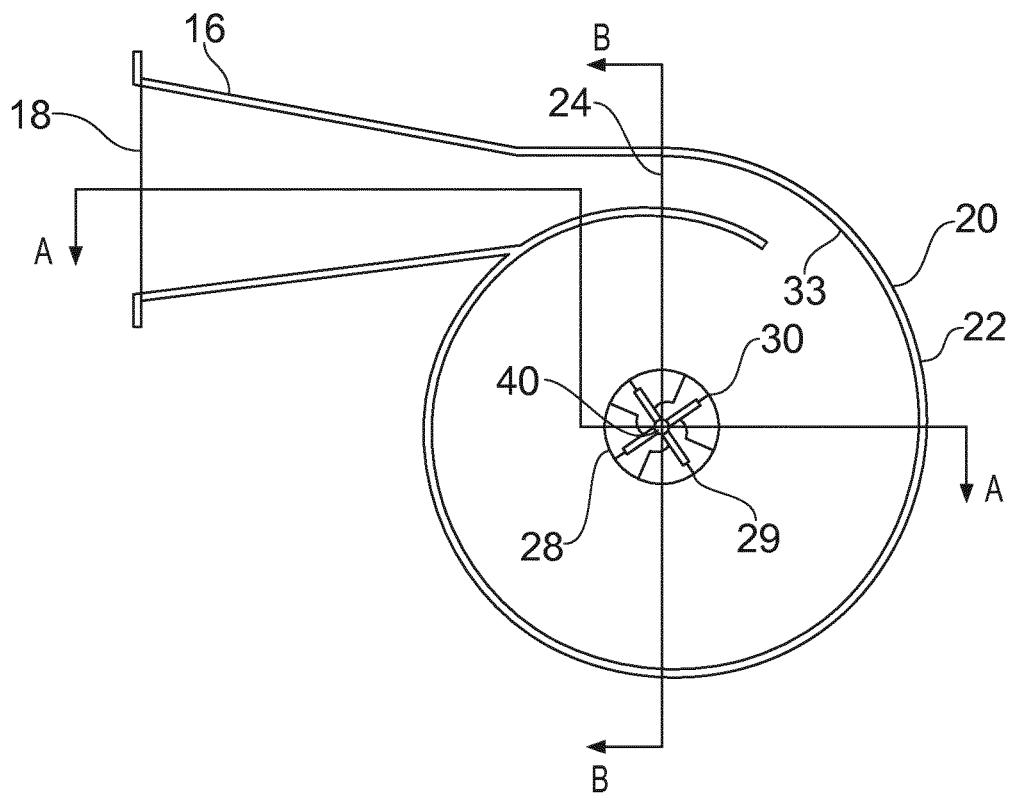
FIG. 3 shows a sectional view along line C-C shown in FIG. 2.
Figure 4:
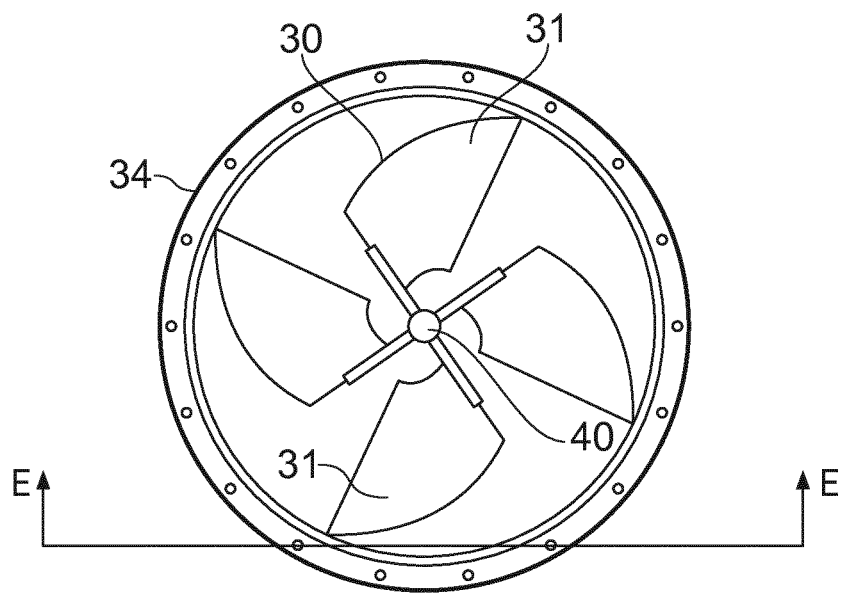
FIG. 4 shows a sectional view D-D shown in FIG. 1.
Figure 5:
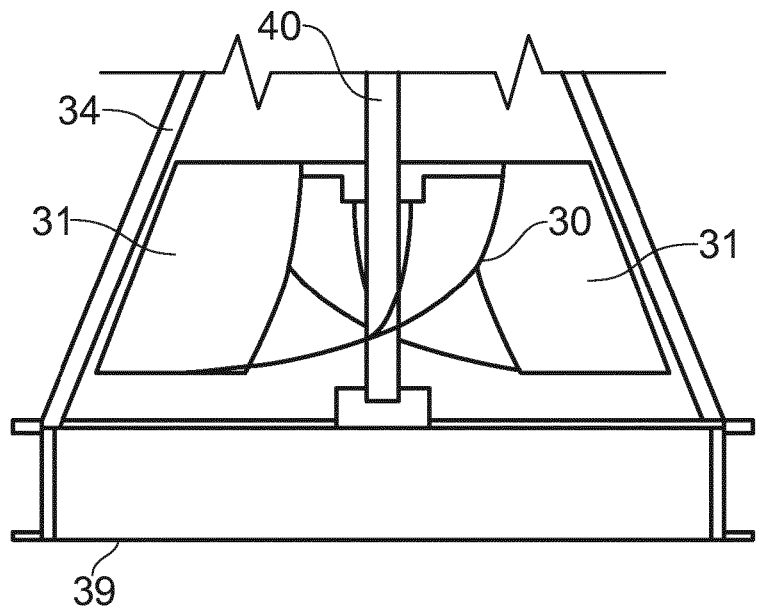
FIG. 5 shows a view E-E shown in FIG. 4.
Figure 11:
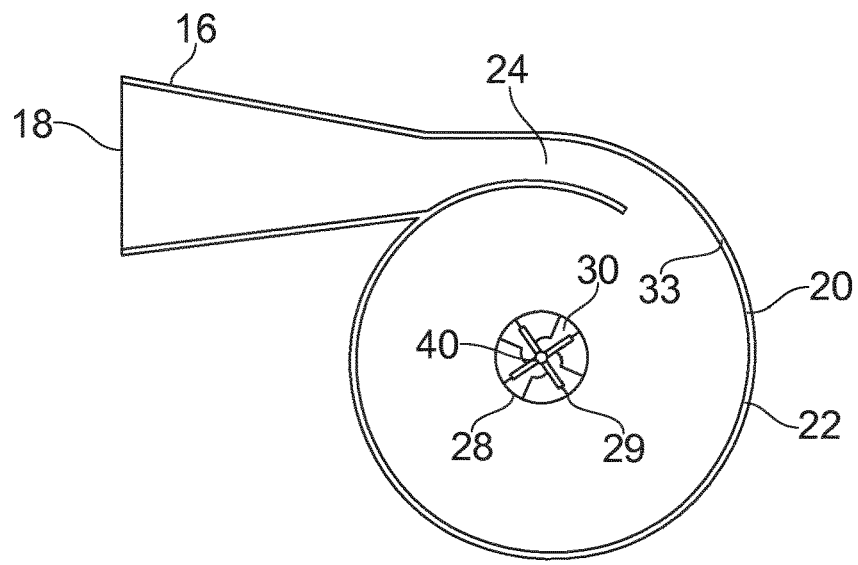
FIGS. 11 to 15 show sections of alternative examples of swirl housings which form part of a vortex generator of the present disclosure.

FIGS. 11 to 15 illustrate examples of different inlet configurations. FIG. 11 is the same as shown in FIG. 3, provided for ease of reference to the examples shown in FIGS. 12 to 15. In all examples the intake duct 16 comprises a portion which is at a tangent to the swirl housing 20, thereby providing a flow duct which extends upstream of the housing inlet port 24.

Figure 12:
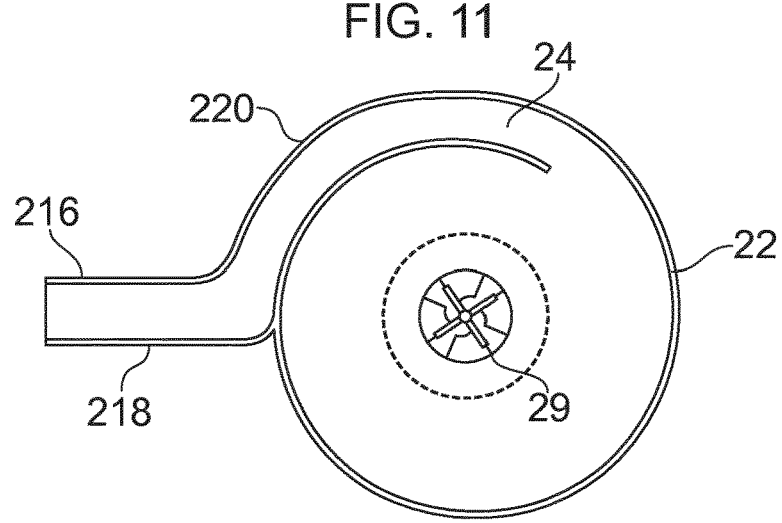

In FIG. 12 an intake duct 216 is provided which comprises a first straight portion 218 which is aligned with a radial direction of the housing 22, and a curved portion 220 which follows the curvature of the outer wall of the housing 22 for about 25% of the circumference of the outer wall before terminating at the inlet port 24.

Figure 13:
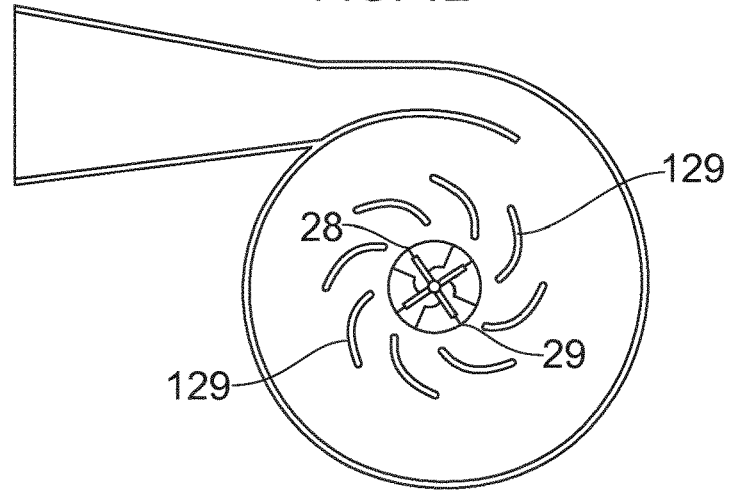

FIG. 13 shows an example similar to that of FIGS. 3, 11, with additional guide vanes 129 provided around, and spaced apart from, the periphery of outlet port 28. Hence in this example guide vanes 29 may be provided nested within (i.e. radially inward of) the additional guide vanes 129.

Figure 14:
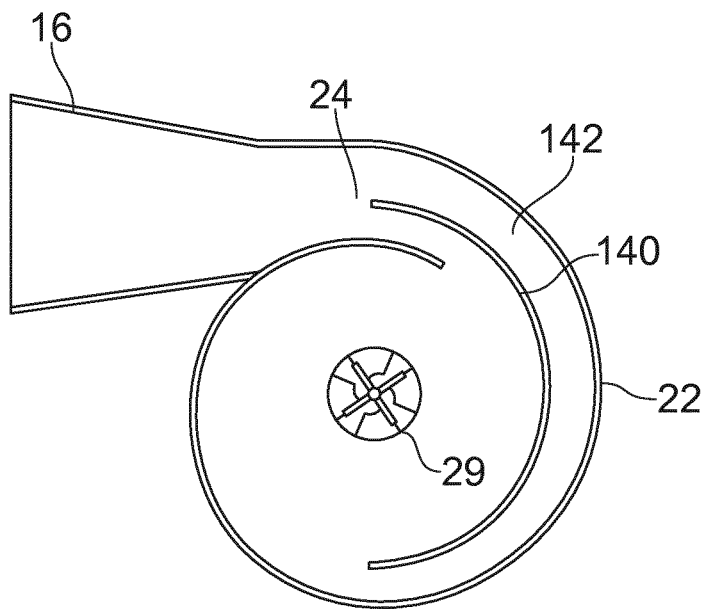

FIG. 14 shows a further example, similar to that of FIGS. 3, 11, in which a curved guide vane/wall 140 is provided which extends from the inlet port 24 radially inwards of, and spaced apart from, the wall of the housing 22, to extend about half of the circumference of the chamber 22. This provides a flow channel 142 between the wall 140 and housing 22 to promote swirl around the wall of the housing 22.

Figure 15:
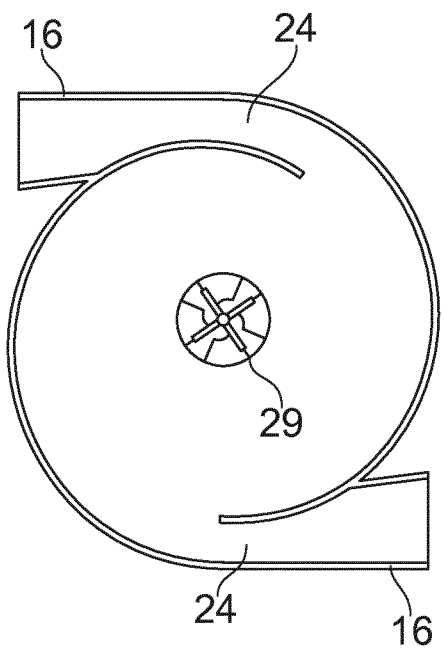

FIG. 15 shows a further example in which two intake ducts 16 are provided tangentially to the primary vortex chamber 22, both being in fluid communication with the first fluid source. In alternative examples, three or more intake ducts 16 may be provided, each in fluid communication with the first fluid source.

In the preceding examples, the fluid working apparatus and fluid working system comprise a single vortex generator 10. However, in both hydroelectric and treatment/missing applications, a number of vortex generators may also be arranged in parallel or serial configuration for the purpose which may provide advantages of accumulated power generation or aeration treatment. Hence, the fluid working apparatus and fluid working system may comprise two or more vortex generators 10.

Figure 16:
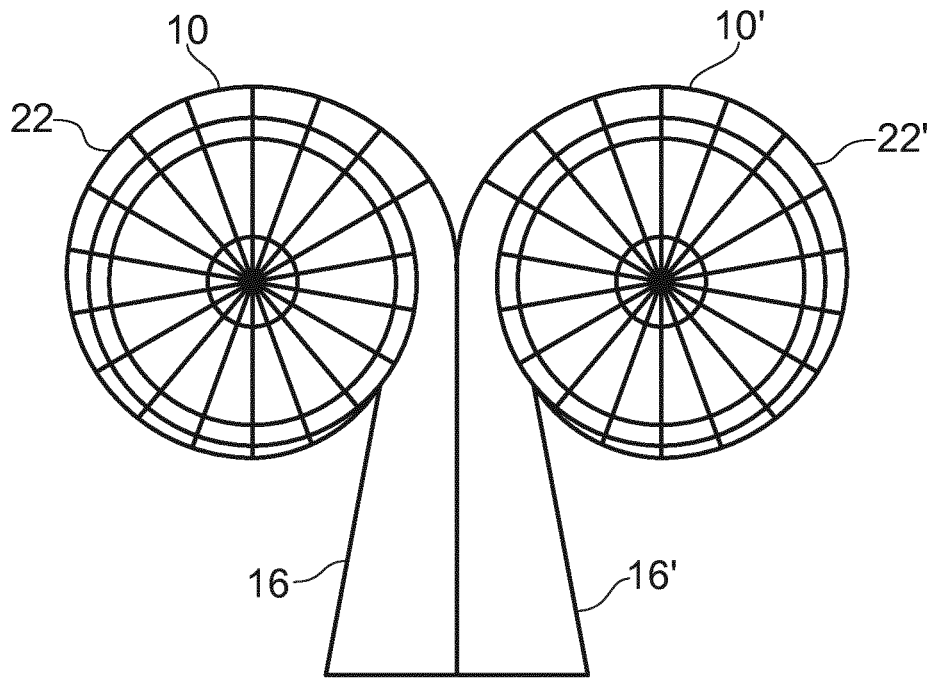
FIGS. 16 to 19 show further examples of fluid working systems including vortex generators of the present disclosure.

For example, as shown in FIG. 16, two vortex generators 10, 10' may be provided "in parallel". That is to say, they each have an intake duct 16, 16' fed from the same first fluid source, and exhaust to respective fluid outlet ducts 34.

Figure 17:
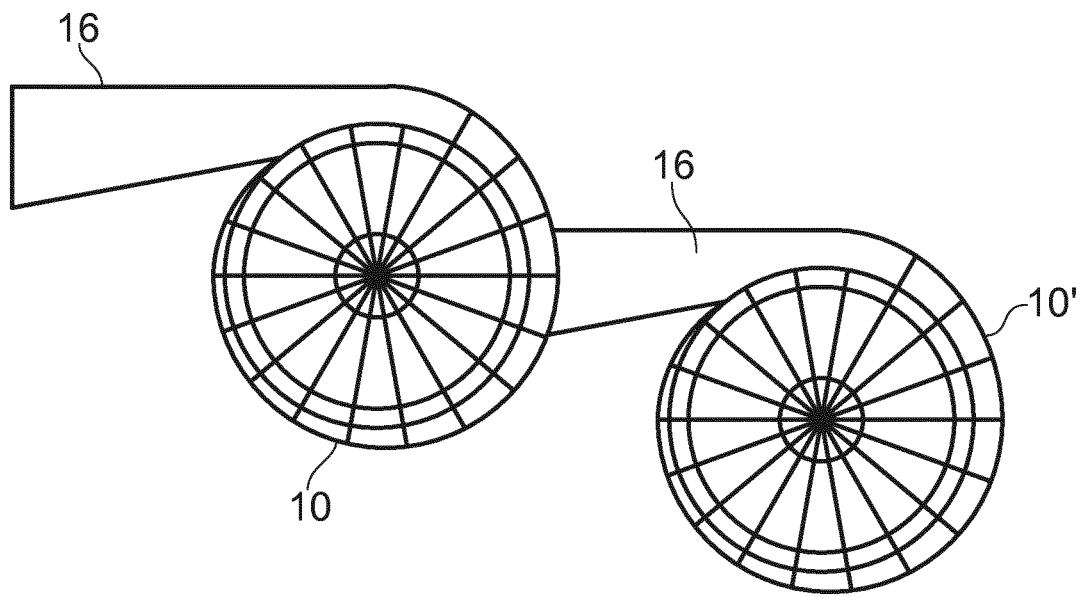

Alternatively, as shown in FIG. 17, two vortex generators 10, 10' may be provided "series". That is to say, they each have an intake duct 16, 16'. However only the inlet 16 the first vortex generator 10 is in direct fluid communication with the first fluid source. The outlet duct 34 of the first vortex generator 10 is in fluid communication with the inlet duct 16' of the second vortex generator 10'.

Figure 18:
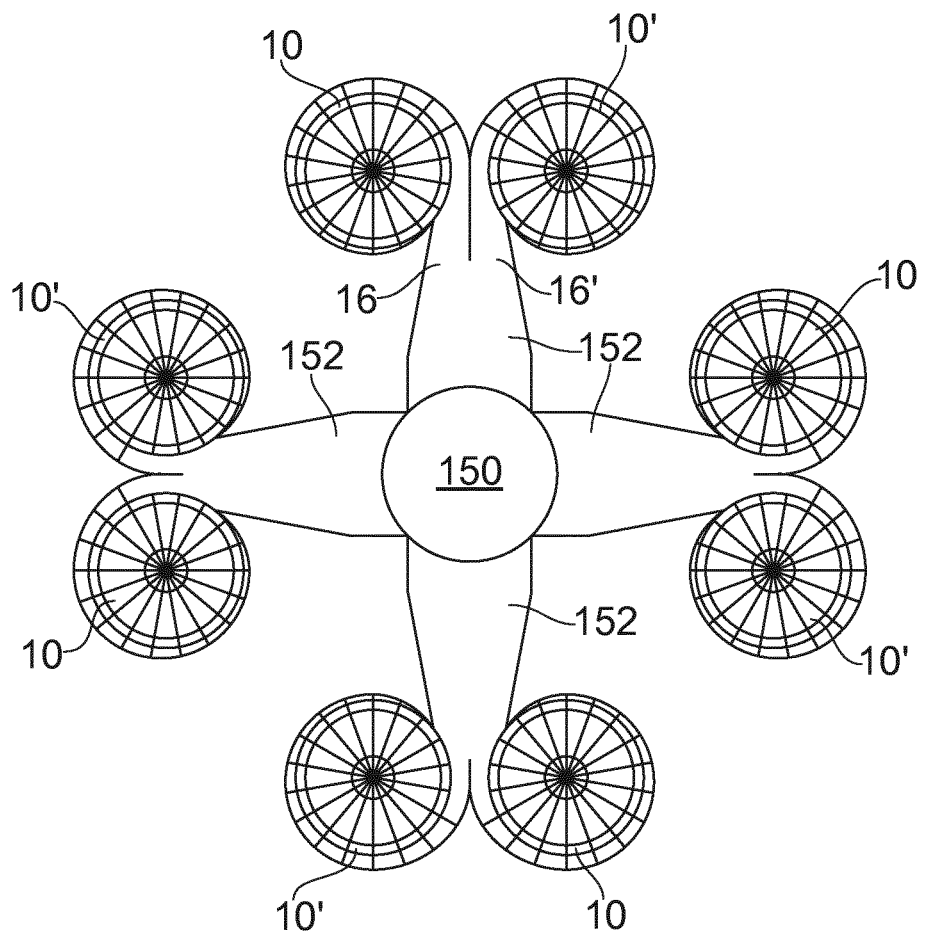

In a further example, shown in FIG. 18, several pairs of vortex generators 10, 10', with their respective intake ducts 16, 16 are in in fluid communication with the first fluid source via a hub/duct 150. Ducts 152 lead from the hub 150 to the inlets 16, 16'. As shown, the pairs or vortex generators 10, 10' may be provided opposite one another across the hub 150.

Figure 19:
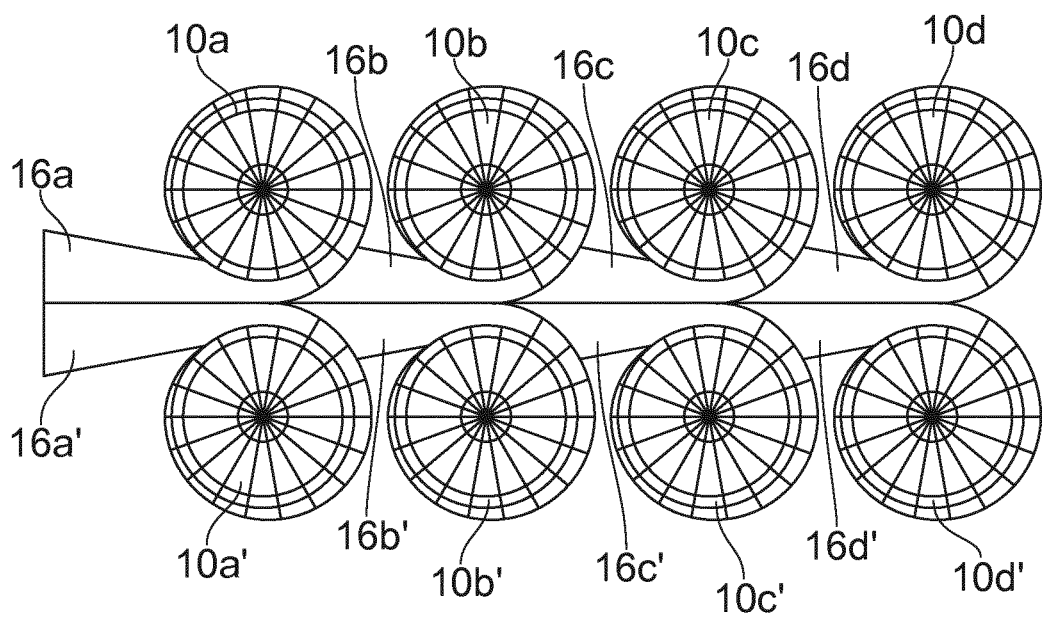

In a further example, shown in FIG. 19, several pairs of vortex generators 10, 10', are arranged in series, in a system akin to that of FIG. 17. That is to say, a first pair of vortex generators 10a, 10a' each have an intake duct 16a, 16a' in direct fluid communication with the first fluid source. The outlets 34 of the first pair of vortex generators 10a, 10a' feed the inlets 16b, 16b' of the second pair of vortex generators 10b, 10b'. The outlets 34 of the second pair of vortex generators 10b, 10b' feed the inlets 16c, 16c' of the third pair of vortex generators 10c, 10c'. The outlets 34 of the third pair of vortex generators 10c, 10c' feed the inlets 16d, 16d' of the fourth pair of vortex generators 10d, 10d'.

A vortex generator of the present disclosure may be applied to a number of applications for example: Fluid Treatment (Aeration and mixing) for wastewater treatment plants, domestic wastewater treatment systems, aquaculture and aquariums; food processing, mining, chemical mixing, fuel injection, industrial agitation, homogenisation processes; storm and wastewater grit separation, hydropower generation whether domestic or industrial scales, hydropower recovery from wastewater, sewer systems, water treatment plants, processed industrial water and desalination plants (e.g. salt water concentrate discharge).

Hence there is provided an apparatus configured for the mixing of fluid and/or also which may provide a core of an energy recovery system.

Recovered energy may be utilised in a number of ways including (a) to offset total energy costs in a treatment system which comprises apparatus of the present disclosure; (b) fed directly to powered part of the system, for example the fluid pump 72, to thereby offset power usage; and/or (c) stored in a battery bank. Local energy storage may permit a reverse use of the system by converting electrical energy to mechanical energy by operating the generator 44 in reverse in order to provide mixing using the turbine impeller 31 (for example, in aeration system example of FIG. 6, between aeration cycles.)

The vortex generator, which may also be termed an "annular jet turbine" as, to operate, it must comprise a turbine, thus provides a high efficiency low head (low pressure) hydropower turbine which operates on the basis of dual phase flow (i.e. two separate fluids are permitted in the turbine chambers).

The annular jet turbine is configured to operate in response to low-head (low pressure) locations for hydropower generation. It also may be used to provide an effective aeration device which offsets power use by using an energy recovery system.

Hence the annular jet turbine provides a low-head (or low pressure) impulse turbine in whereby the kinetic energy is extracted with no subsequent change in the fluid pressure at the turbine blades 31. As a result, the hydraulic efficiency of the turbine 30 is greater than that of conventional low-head hydropower technologies.

Figure 20:
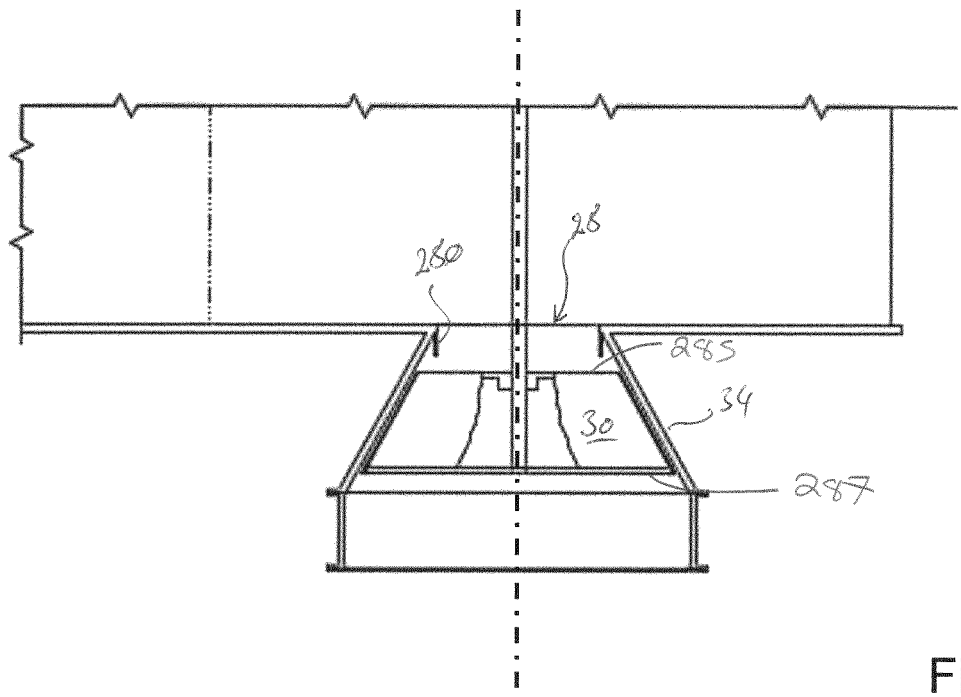
FIGS. 20, 21 show a further example of a vortex generator.
Figure 21:
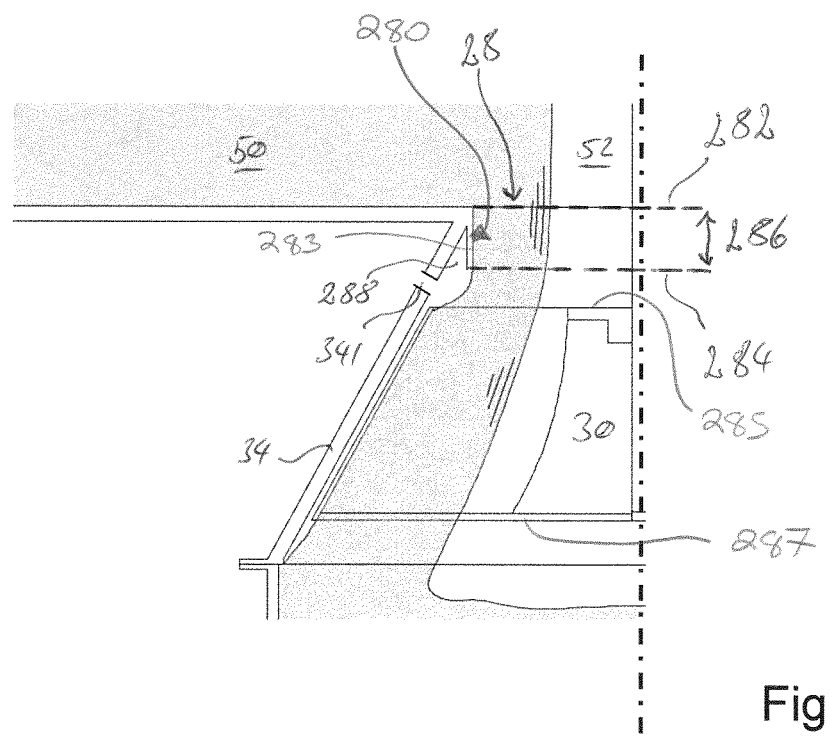

In a further example, shown in FIGS. 20, 21, the fluid outlet port 28 comprises an extended mouth 280. According to this example, the fluid outlet port 28 is alternatively referred to as a protruding fluid outlet port 28.

The extended mouth 280 is defined by a wall 283 which extends from the swirl housing 20 around the edge of the fluid outlet port 28 and part of the way into the cavity/volume defined by the duct 34. The extended mouth 280 thus comprises an inlet 282 and a flow passage 286 which extends to, and terminates at, an outlet 284. That is to say, the inlet 282 defines an inlet opening through which fluid from the fluid tank 22 may enter the flow passage 286. The flow passage 286 extends into the fluid outlet duct 34 and towards a turbine inlet 285 of the turbine 30. Put another way, the extended mouth outlet 284 defines an outlet opening 284 configured to discharge fluid from the flow passage 286 into the fluid outlet duct 34 and onto the turbine 30.

The outlet 284 may have a diameter which is smaller than the rotational diameter of the turbine 30. That is to say the outlet 284 may have a diameter which is smaller than the diameter defined by tips of rotatable blades of the turbine at turbine inlet 285. The turbine may vary/alter in diameter along its rotational axis. For example the diameter of the turbine outlet 287 may be greater than the diameter of turbine inlet 285, the turbine inlet diameter being the diameter of the upstream face of the turbine 30 facing the extended mouth outlet 284.

In either example, the extended mouth 280, having a smaller diameter than the turbine inlet 285, is thereby operable to restrict the formation of a fluid jet extending from the tank 22 to the turbine 30 to have a diameter which is smaller than the diameter of the turbine inlet 285. Thus the extended mouth 280 defines a funnel or nozzle (i.e. a fluid jet defining channel). According to the present example, the extended mouth 280 is coaxial with the turbine 30 and with the fluid rotational axis 32. The resultant fluid annular jet will therefore be incident centrally on the turbine 30.

The fluid outlet duct 34 may comprise a vent hole 341. According to the present example, the vent hole 341 is located between the turbine inlet 285 and the wall 283 which defines the extended mouth 280. That is to say, the vent hole 341 is provided in the wall of the duct 34 downstream of the extended mouth outlet 284 and upstream of the turbine inlet 285. The vent hole 341 is configured to enable fluid exchange between the space/volume enclosed by the fluid outlet duct 34 and the environment surrounding the outside of the fluid outlet duct 34. In particular, the vent hole 341 is configured to allow a gas, such as air, to pass through the vent hole in response to a pressure difference and/or change inside the duct. That is to say, the vent hole 34 extends between the enclosed space within the fluid outlet duct 34 and the exterior space surrounding the fluid outlet duct 34.

In operation, a fluid jet funnelled by means of the extended mouth 280 is passed onto (i.e. delivered to) the turbine 30. The extended mouth 280 thus prevents, or at least reduces, the portion of the fluid jet which passes in the clearance gap between the turbine impeller and the outlet duct 34 extending around the turbine impeller. Thus "flow leakage" around the turbine is reduced. Put another way, the provision of the extended mouth 280 directs flow onto the central core of the turbine and away from the turbine outer radius, so the amount of fluid bypassing the turbine 30 may be reduced. Consequently, the amount of fluid passing through the turbine 30 may be maximised.

The turbine may be an unshrouded turbine.

In an alternative example the turbine may be provided as a shrouded turbine (i.e. having a shroud which inhibits or prevents the passage of fluid to the clearance region. In such an example the leakage may be further reduced, thereby increasing efficiency.

During operation of the vortex generator 10, the pressure in the fluid outlet duct 34 may change. In particular, the pressure may drop below an ambient pressure, e.g. become sub-atmospheric. In this case, fluid may be exchanged between the space enclosed by the outlet duct 34 and the space surrounding the outlet duct 34 via the vent hole 341 to maintain equalised pressure.

Hence the extended mouth 380 reduces flow leakage, thus increasing the amount of fluid passing through the turbine. As a result, the energy exchange between fluid and turbine 30 is increased. Also, through reducing flow leakage the likelihood of blockage or damage to the turbine may be reduced, as particles carried by the annular jet are less likely to be caught between the turbine and outlet duct.

The vent hole 34 reduces a pressure differential between interior and exterior which may be generated, thereby further increasing efficiency and reducing the potential for cavitation.

The extended mouth 280 may have any suitable shape. According to the present example, the extended mouth 280 is substantially cylindrical, the wall 283 which defines is extending linearly along the fluid rotational axis 32 and having a circular cross-section. According to other examples, the extended mouth 280 may have different shapes including, for example, a funnel having frusto-conical shape, wherein the flow passage 286 defined by the extended mouth converges from the inlet 282 to the outlet 284. According to yet further examples, the flow passage 286 diverges from the inlet 282 to the outlet 284.

A gap 288 may be formed between the fluid outlet duct 34 and the extended mouth 280 protruding into the fluid outlet duct 34. In other examples, the extended mouth 280 may be joined to the fluid outlet duct 34 and no gap or a gap of reduced size is formed. In another example, the wall 283 may extend from the fluid outlet duct 34 (e.g. be formed integrally with each other) such that the wall of the fluid outlet duct 34 extends to form the wall 283 of the extended mouth 280 with no gap in between.

The vent hole 341 may have any suitable size and shape. For example, the vent hole may be a circular aperture or an elongated slot. There may be provided only one vent hole 341. In other examples there may be provided a plurality of vent holes 341. The plurality of vent hole 341 may be equally spaced around the circumference of the duct wall in which they are provided.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A vortex generator apparatus for mixing of fluids comprising:
    a fluid intake duct;
    a fluid tank comprising:
        a first fluid inlet port in fluid communication with the fluid intake duct,
        a second fluid inlet port, and
        a fluid outlet port;
    a turbine provided
        outside of the fluid tank
        in fluid communication with the fluid outlet port;
    wherein the vortex generator apparatus comprises a fluid outlet duct in fluid communication with the fluid outlet port and wherein the turbine is located within the fluid outlet duct; and
    wherein the fluid outlet duct has a divergent wall section surrounding the turbine.

2. The vortex generator apparatus as claimed in claim 1 wherein:
    the fluid tank defines a substantially cylindrical swirl chamber,
    centred on a fluid rotational axis;
    the second fluid inlet port,
    fluid outlet port; and
    turbine
    also being centred on the fluid rotational axis.

3. The vortex generator apparatus as claimed in claim 2 wherein:
    the second fluid inlet port; and
    the fluid outlet port
    are centred on the fluid rotational axis at opposite sides of the fluid tank; and
    the fluid outlet port is spaced between the second fluid inlet port and the turbine.

4. The vortex generator apparatus as claimed in claim 2, wherein:
    the fluid intake duct is:
        provided substantially on a tangent to a side wall of the fluid tank; and
        aligned to deliver fluid to an internal surface of the fluid side wall to thereby induce swirl about the fluid rotational axis.

5. The vortex generator apparatus as claimed in claim 2, wherein
    the fluid outlet port comprises an extended mouth which extends towards an inlet of the turbine; and
    the extended mouth comprises an outlet having a diameter which is smaller than the diameter of the turbine inlet.

6. The vortex generator apparatus as claimed in claim 5, wherein
    a vent hole is provided in the wall of the duct downstream of the extended mouth outlet and upstream of the turbine inlet.

7. The fluid working system comprising a fluid working apparatus as claimed in claim 6, comprising:
    a first fluid reservoir;
    the fluid pump being in fluid communication with the first fluid reservoir to thereby extract fluid from the fluid reservoir;
    a second fluid source; and
    the second fluid inlet port being in fluid communication with the second fluid source.

8. The fluid working system as claimed in claim 7, wherein
    the swirl chamber outlet duct exit is submerged beneath the surface of the first fluid in the first fluid reservoir
    to thereby deliver a mix of the first fluid and second fluid to the first fluid reservoir.

9. The fluid working system as claimed in claim 8, comprising:
   a support structure which maintains the swirl chamber above the level of the surface of the fluid in the first fluid reservoir.

10. The vortex generator apparatus as claimed in claim 1, wherein:
    the fluid outlet duct further comprises, in series with the divergent wall section:
    a parallel wall section; and
    a convergent wall section terminating at a duct exit.

11. The vortex generator apparatus as claimed in claim 1, wherein
    a shaft extends from the turbine.

12. The vortex generator apparatus as claimed in claim 11 wherein:
    the shaft extends from the turbine,
    through the fluid outlet port,
    through the fluid tank, and
    through the second fluid inlet port.

13. A fluid working apparatus comprising a vortex generator as claimed in claim 1.

14. The fluid working apparatus as claimed in claim 13 further comprising:
    a fluid delivery apparatus in flow communication with the fluid intake duct;
    the fluid delivery apparatus comprising a fluid pump.

15. The vortex generator apparatus as claimed in claim 1 wherein:
    the turbine comprises one or more turbine blades, and
    the divergent wall section encircles the one or more turbine blades.

16. A vortex generator apparatus for mixing of fluids comprising:
    a fluid intake duct;
    a fluid tank comprising:
       a first fluid inlet port in fluid communication with the fluid intake duct,
       a second fluid inlet port, and
       a fluid outlet port;
    a turbine provided outside of the fluid tank in fluid communication with the fluid outlet port; wherein
    the vortex generator apparatus comprises a fluid outlet duct in fluid communication with the fluid outlet port and the turbine is located within the fluid outlet duct;
    the fluid outlet duct has a divergent wall section around the turbine; and
    a shaft extends from the turbine, through the fluid outlet port, through the fluid tank, and through the second fluid inlet port.

17. A vortex generator apparatus for mixing of fluids comprising:
    a fluid intake duct;
    a fluid tank comprising:
       a first fluid inlet port in fluid communication with the fluid intake duct,
       a second fluid inlet port, and
       a fluid outlet port;
    a turbine provided outside of the fluid tank in fluid communication with the fluid outlet port; wherein
    the vortex generator apparatus comprises a fluid outlet duct in fluid communication with the fluid outlet port and wherein the turbine is located within the fluid outlet duct;
    the fluid outlet duct has a divergent wall section around the turbine;
    the fluid tank defines a substantially cylindrical swirl chamber centred on a fluid rotational axis;
    the second fluid inlet port, the fluid outlet port, and the turbine also are centred on the fluid rotational axis;
    the fluid outlet port comprises an extended mouth which extends towards an inlet of the turbine;
    the extended mouth comprises an outlet having a diameter which is smaller than the diameter of the turbine inlet; and
    a vent hole is provided in the wall of the duct downstream of the extended mouth outlet and upstream of the turbine inlet.

* * * * *